United States Patent
Meiri et al.

(10) Patent No.: US 10,095,428 B1
(45) Date of Patent: Oct. 9, 2018

(54) LIVE MIGRATION OF A TREE OF REPLICAS IN A STORAGE SYSTEM

(71) Applicant: EMC Corporation, Hopkinton, MA (US)

(72) Inventors: David Meiri, Cambridge, MA (US); Yuval Harduf, Yehud (IL); Xiangping Chen, Sherborn, MA (US); Tal Ben-Moshe, Kiryat Ono (IL); Philip Love, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 151 days.

(21) Appl. No.: 15/085,168

(22) Filed: Mar. 30, 2016

(51) Int. Cl.
 *G06F 3/06* (2006.01)

(52) U.S. Cl.
 CPC ............ *G06F 3/0619* (2013.01); *G06F 3/065* (2013.01); *G06F 3/067* (2013.01); *G06F 3/0647* (2013.01); *G06F 3/0652* (2013.01)

(58) Field of Classification Search
 CPC ...... G06F 3/0619; G06F 3/0647; G06F 3/065; G06F 3/0652; G06F 3/067; G06F 12/0623; G06F 12/0891; G06F 12/12
 USPC ........ 711/162, 166; 707/634, 667, 670, 802, 707/812
 See application file for complete search history.

(56) References Cited

U.S. PATENT DOCUMENTS

| | | |
|---|---|---|
| 4,164,763 A | 8/1979 | Briccetti et al. |
| 4,608,839 A | 9/1986 | Tibbals, Jr. |
| 4,821,178 A | 4/1989 | Levin et al. |
| 5,319,645 A | 6/1994 | Bassi et al. |
| 5,537,534 A | 7/1996 | Voigt et al. |
| 5,539,907 A | 7/1996 | Srivastava et al. |
| 5,627,995 A | 5/1997 | Miller et al. |
| 5,710,724 A | 1/1998 | Burrows |
| 5,732,273 A | 3/1998 | Srivastava et al. |
| 5,860,137 A | 1/1999 | Raz et al. |
| 5,896,538 A | 4/1999 | Blandy et al. |
| 5,903,730 A | 5/1999 | Asai et al. |
| 5,940,618 A | 8/1999 | Blandy et al. |
| 5,940,841 A | 8/1999 | Schmuck et al. |
| 5,987,250 A | 11/1999 | Subrahmanyam |

(Continued)

FOREIGN PATENT DOCUMENTS

| | | |
|---|---|---|
| EP | 1804157 | 7/2007 |
| WO | WO 2010/019596 | 2/2010 |

(Continued)

OTHER PUBLICATIONS

Response filed on May 2, 2016 to the Non-Final Office Action dated Dec. 1, 2015; for U.S. Appl. No. 14/230,405; 8 pages.

(Continued)

*Primary Examiner* — Eric Cardwell
(74) *Attorney, Agent, or Firm* — Daly, Crowley Mofford & Durkee, LLP

(57) ABSTRACT

Described embodiments may provide systems and processes for migrating a replica hierarchy from at least one source device to at least one target device in a storage system. A configuration of the replica hierarchy is migrated, one or more internal nodes of the replica hierarchy are migrated, and one or more leaf nodes of the replica hierarchy are migrated. A cutover operation is performed by deactivating the at least one source device associated with the included replica hierarchy.

18 Claims, 8 Drawing Sheets

(56) References Cited

U.S. PATENT DOCUMENTS

| | | | |
|---|---|---|---|
| 5,999,842 | A | 12/1999 | Harrison et al. |
| 6,226,787 | B1 | 5/2001 | Serra et al. |
| 6,327,699 | B1 | 12/2001 | Larus et al. |
| 6,353,805 | B1 | 3/2002 | Zahir et al. |
| 6,470,478 | B1 | 10/2002 | Bargh et al. |
| 6,519,766 | B1 | 2/2003 | Barritz et al. |
| 6,643,654 | B1 | 11/2003 | Patel et al. |
| 6,654,948 | B1 | 11/2003 | Konuru et al. |
| 6,658,471 | B1 | 12/2003 | Berry et al. |
| 6,658,654 | B1 | 12/2003 | Berry et al. |
| 6,870,929 | B1 | 3/2005 | Greene |
| 7,099,797 | B1 | 8/2006 | Richard |
| 7,143,410 | B1 | 11/2006 | Coffman et al. |
| 7,251,663 | B1 | 7/2007 | Smith |
| 7,315,795 | B2 | 1/2008 | Homma |
| 7,389,497 | B1 | 6/2008 | Edmark et al. |
| 7,421,681 | B2 | 9/2008 | DeWitt, Jr. et al. |
| 7,552,125 | B1 | 6/2009 | Evans |
| 7,574,587 | B2 | 8/2009 | DeWitt, Jr. et al. |
| 7,672,005 | B1 | 3/2010 | Hobbs et al. |
| 7,714,747 | B2 | 5/2010 | Fallon |
| 7,814,218 | B1 | 10/2010 | Knee et al. |
| 7,827,136 | B1 | 11/2010 | Wang et al. |
| 7,908,436 | B1 | 3/2011 | Srinivasan et al. |
| 8,200,923 | B1 | 6/2012 | Healey et al. |
| 8,335,899 | B1 | 12/2012 | Meiri et al. |
| 8,478,951 | B1 | 7/2013 | Healey et al. |
| 9,037,822 | B1 | 5/2015 | Meiri et al. |
| 9,104,326 | B2 | 8/2015 | Frank et al. |
| 9,128,942 | B1* | 9/2015 | Pfau ................. G06F 17/30091 |
| 9,208,162 | B1 | 12/2015 | Hallak et al. |
| 9,270,592 | B1 | 2/2016 | Sites |
| 9,286,003 | B1 | 3/2016 | Hallak et al. |
| 9,304,889 | B1 | 4/2016 | Chen et al. |
| 9,330,048 | B1 | 5/2016 | Bhatnagar et al. |
| 9,342,465 | B1 | 5/2016 | Meiri |
| 9,378,106 | B1 | 6/2016 | Ben-Moshe et al. |
| 9,396,243 | B1 | 7/2016 | Halevi et al. |
| 9,418,131 | B1 | 8/2016 | Halevi et al. |
| 9,762,460 | B2 | 9/2017 | Pawlowski et al. |
| 9,769,254 | B2 | 9/2017 | Gilbert et al. |
| 9,785,468 | B2 | 10/2017 | Mitchell et al. |
| 2002/0056031 | A1 | 5/2002 | Skiba et al. |
| 2002/0133512 | A1 | 9/2002 | Mililo et al. |
| 2003/0023656 | A1 | 1/2003 | Hutchison et al. |
| 2003/0079041 | A1 | 4/2003 | Parrella, Sr. et al. |
| 2003/0126122 | A1 | 7/2003 | Bosley et al. |
| 2003/0145251 | A1 | 7/2003 | Cantrill |
| 2004/0030721 | A1 | 2/2004 | Kruger et al. |
| 2004/0267835 | A1 | 12/2004 | Zwilling et al. |
| 2005/0039171 | A1 | 2/2005 | Avakian et al. |
| 2005/0102547 | A1 | 5/2005 | Keeton et al. |
| 2005/0125626 | A1 | 6/2005 | Todd |
| 2005/0144416 | A1 | 6/2005 | Lin |
| 2005/0171937 | A1 | 8/2005 | Hughes et al. |
| 2005/0177603 | A1 | 8/2005 | Shavit |
| 2005/0193084 | A1 | 9/2005 | Todd et al. |
| 2005/0278346 | A1 | 12/2005 | Shang et al. |
| 2006/0031653 | A1 | 2/2006 | Todd et al. |
| 2006/0031787 | A1 | 2/2006 | Ananth et al. |
| 2006/0047776 | A1 | 3/2006 | Chieng et al. |
| 2006/0070076 | A1 | 3/2006 | Ma |
| 2006/0123212 | A1 | 6/2006 | Yagawa |
| 2006/0242442 | A1 | 10/2006 | Armstrong et al. |
| 2007/0078982 | A1 | 4/2007 | Aidun et al. |
| 2007/0208788 | A1 | 9/2007 | Chakravarty et al. |
| 2007/0276885 | A1 | 11/2007 | Valiyaparambil et al. |
| 2007/0297434 | A1 | 12/2007 | Arndt et al. |
| 2008/0163215 | A1 | 7/2008 | Jiang et al. |
| 2008/0178050 | A1 | 7/2008 | Kern et al. |
| 2008/0243952 | A1 | 10/2008 | Webman et al. |
| 2008/0288739 | A1 | 11/2008 | Bamba et al. |
| 2009/0006745 | A1 | 1/2009 | Cavallo et al. |
| 2009/0030986 | A1 | 1/2009 | Bates |
| 2009/0049450 | A1 | 2/2009 | Dunshea et al. |
| 2009/0055613 | A1 | 2/2009 | Maki et al. |
| 2009/0089483 | A1 | 4/2009 | Tanaka et al. |
| 2009/0100108 | A1* | 4/2009 | Chen ................. G06F 17/30067 |
| 2009/0222596 | A1 | 9/2009 | Flynn et al. |
| 2009/0319996 | A1 | 12/2009 | Shafi et al. |
| 2010/0042790 | A1 | 2/2010 | Mondal et al. |
| 2010/0088296 | A1 | 4/2010 | Periyagaram et al. |
| 2010/0180145 | A1 | 7/2010 | Chu |
| 2010/0199066 | A1 | 8/2010 | Artan et al. |
| 2010/0205330 | A1 | 8/2010 | Noborikawa et al. |
| 2010/0223619 | A1 | 9/2010 | Jaquet et al. |
| 2010/0257149 | A1 | 10/2010 | Cognigni et al. |
| 2011/0060722 | A1 | 3/2011 | Li et al. |
| 2011/0078494 | A1 | 3/2011 | Maki et al. |
| 2011/0083026 | A1 | 4/2011 | Mikami et al. |
| 2011/0099342 | A1 | 4/2011 | Ozdemir |
| 2011/0119679 | A1 | 5/2011 | Muppirala et al. |
| 2011/0161297 | A1 | 6/2011 | Parab |
| 2011/0202744 | A1 | 8/2011 | Kulkarni et al. |
| 2011/0225122 | A1 | 9/2011 | Denuit et al. |
| 2011/0289291 | A1 | 11/2011 | Agombar et al. |
| 2012/0054472 | A1 | 3/2012 | Altman et al. |
| 2012/0059799 | A1* | 3/2012 | Oliveira ............. H04L 67/1097 707/656 |
| 2012/0078852 | A1 | 3/2012 | Haselton et al. |
| 2012/0124282 | A1 | 5/2012 | Frank et al. |
| 2012/0158736 | A1 | 6/2012 | Milby |
| 2012/0203742 | A1 | 8/2012 | Goodman et al. |
| 2012/0278793 | A1 | 11/2012 | Jalan et al. |
| 2012/0290546 | A1 | 11/2012 | Smith et al. |
| 2012/0290798 | A1 | 11/2012 | Huang et al. |
| 2012/0304024 | A1 | 11/2012 | Rohleder et al. |
| 2013/0031077 | A1 | 1/2013 | Liu et al. |
| 2013/0054524 | A1 | 2/2013 | Anglin et al. |
| 2013/0073527 | A1 | 3/2013 | Bromley |
| 2013/0110783 | A1 | 5/2013 | Wertheimer et al. |
| 2013/0111007 | A1 | 5/2013 | Hoffmann et al. |
| 2013/0138607 | A1 | 5/2013 | Bashyam et al. |
| 2013/0151683 | A1* | 6/2013 | Jain ....................... G06F 3/0611 709/223 |
| 2013/0151759 | A1 | 6/2013 | Shim et al. |
| 2013/0198854 | A1 | 8/2013 | Erway et al. |
| 2013/0246354 | A1 | 9/2013 | Clayton et al. |
| 2013/0246724 | A1 | 9/2013 | Furuya |
| 2013/0265883 | A1 | 10/2013 | Henry et al. |
| 2013/0282997 | A1 | 10/2013 | Suzuki et al. |
| 2013/0318051 | A1 | 11/2013 | Kumar et al. |
| 2013/0332610 | A1 | 12/2013 | Beveridge |
| 2014/0040199 | A1* | 2/2014 | Golab ............... G06F 17/30309 707/634 |
| 2014/0136759 | A1 | 5/2014 | Sprouse et al. |
| 2014/0143206 | A1 | 5/2014 | Pittelko |
| 2014/0161348 | A1 | 6/2014 | Sutherland et al. |
| 2014/0195484 | A1 | 7/2014 | Wang et al. |
| 2014/0237201 | A1 | 8/2014 | Swift |
| 2014/0297588 | A1 | 10/2014 | Babashetty et al. |
| 2014/0359231 | A1 | 12/2014 | Matthews |
| 2014/0380282 | A1 | 12/2014 | Ravindranath Sivalingam et al. |
| 2015/0006910 | A1 | 1/2015 | Shapiro |
| 2015/0088823 | A1 | 3/2015 | Chen et al. |
| 2015/0112933 | A1 | 4/2015 | Satapathy |
| 2015/0149739 | A1 | 5/2015 | Seo et al. |
| 2015/0161194 | A1 | 6/2015 | Provenzano et al. |
| 2015/0205816 | A1 | 7/2015 | Periyagaram et al. |
| 2015/0249615 | A1 | 9/2015 | Chen et al. |
| 2015/0324236 | A1* | 11/2015 | Gopalan ............. G06F 11/1453 711/162 |
| 2015/0363282 | A1 | 12/2015 | Rangasamy |
| 2016/0034692 | A1 | 2/2016 | Singler |
| 2016/0042285 | A1 | 2/2016 | Gilenson et al. |
| 2016/0062853 | A1 | 3/2016 | Sugabrahmam et al. |
| 2016/0080482 | A1 | 3/2016 | Gilbert et al. |
| 2016/0188419 | A1 | 6/2016 | Dagar et al. |
| 2016/0350391 | A1 | 12/2016 | Vijayan et al. |
| 2016/0359968 | A1 | 12/2016 | Chitti et al. |
| 2016/0366206 | A1 | 12/2016 | Shemer et al. |
| 2017/0123704 | A1 | 5/2017 | Sharma et al. |

(56) References Cited

U.S. PATENT DOCUMENTS

2017/0139786 A1    5/2017   Simon et al.
2017/0161348 A1    6/2017   Araki et al.

FOREIGN PATENT DOCUMENTS

WO    WO 2010/040078    4/2010
WO    WO 2012/066528    5/2012

OTHER PUBLICATIONS

Response filed on May 2, 2016 to the Non-Final Office Action dated Feb. 4, 2016; for U.S. Appl. No. 14/037,577; 10 pages.
U.S. Final Office Action dated Nov. 2, 2017 for U.S. Appl. No. 14/494,895; 12 Pages.
U.S. Non-Final Office Action dated Dec. 1, 2017 for U.S. Appl. No. 14/979,890; 10 Pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.
Office Action dated Nov. 1, 2017 corresponding to U.S. Appl. No. 15/196,374; 64 Pages.
Response to U.S. Final Office Action dated Apr. 6, 2016 corresponding to U.S. Appl. No. 14/034,981; Response filed on Jun. 16, 2016; 11 Pages.
Notice of Allowance dated Jun. 29, 2016 corresponding to U.S. Appl. No. 14/034,981; 14 Pages.
Response to U.S. Office Action dated Feb. 4, 2016 corresponding to U.S. Appl. No. 14/037,577; Response filed on May 2, 2016; 10 Pages.
Notice of Allowance dated May 20, 2016 corresponding to U.S. Appl. No. 14/037,577; 19 Pages.
Notice of Allowance dated Jun. 6, 2016 corresponding to U.S. Appl. No. 14/317,449; 43 Pages.
U.S. Appl. No. 15/196,674, filed Jun. 29, 2016, Kleiner, et al.
U.S. Appl. No. 15/196,427, filed Jun. 29, 2016, Shveidel.
U.S. Appl. No. 15/196,374, filed Jun. 29, 2016, Shveidel, et al.
U.S. Appl. No. 15/196,447, filed Jun. 29, 2016, Shveidel, et al.
U.S. Appl. No. 15/196,472, filed Jun. 29, 2016, Shveidel.
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Maeiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915; 200 Pages.
U.S. Appl. No. 12/945,915; 108 Pages.
U.S. Appl. No. 12/945,915; 67 Pages.
Nguyen et al., "B+ Hash Tree: Optimizing Query Execution Times for on-Disk Semantic Web Data Structures;" Proceedings of the $6^{th}$ International Workshop on Scalable Semantic Web Knoledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,981; 28 Pages.
Response to Office Action dated Jul. 22, 2015 corresponding to U.S. Appl. No. 14/034,981; Response filed on Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2016; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
U.S. Non-Final Office Action dated Jul. 6, 2017 for U.S. Appl. No. 14/494,895; 36 Pages.
Response to U.S. Non-Final Office Action dated Jul. 6, 2017 for U.S. Appl. No. 14/494,895; Response filed Oct. 3, 2017; 10 Pages.
U.S. Non-Final Office Action dated Jun. 11, 2018 for U.S. Appl. No. 15/076,775; 17 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.
U.S. Notice of Allowance dated Jan. 24, 2018 corresponding to U.S. Appl. No. 15/085,181; 8 Pages.

\* cited by examiner

LIVE MIGRATION OF A TREE OF REPLICAS IN A STORAGE SYSTEM

BACKGROUND

Computer data is increasingly vital to modern organizations, and protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself is both time consuming and can consume system resources.

Some data protection systems use data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect provides a method for migrating a replica hierarchy of a storage system from at least one source device to at least one target device. A configuration of the replica hierarchy is migrated, one or more internal nodes of the replica hierarchy are migrated, and one or more leaf nodes of the replica hierarchy are migrated. A cutover operation is performed by deactivating the at least one source device associated with the replica hierarchy.

Another aspect provides a system having a processor and memory storing computer program code. When executed on the processor, the computer program code causes the processor to execute a migration process operable to perform operations to migrate a replica hierarchy from at least one source device to at least one target device in a storage system. A configuration of the replica hierarchy is migrated, one or more internal nodes of the replica hierarchy are migrated, and one or more leaf nodes of the replica hierarchy are migrated. A cutover operation is performed by deactivating the at least one source device associated with the replica hierarchy.

Another aspect provides a computer program product including a non-transitory computer readable storage medium. The non-transitory computer readable storage medium includes computer program code. When executed on the processor of a computer, the program code causes the computer to execute a process to migrate a replica hierarchy from at least one source device to at least one target device in a storage system. A configuration of the replica hierarchy is migrated, one or more internal nodes of the replica hierarchy are migrated, and one or more leaf nodes of the replica hierarchy are migrated. A cutover operation is performed by deactivating the at least one source device associated with the replica hierarchy.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
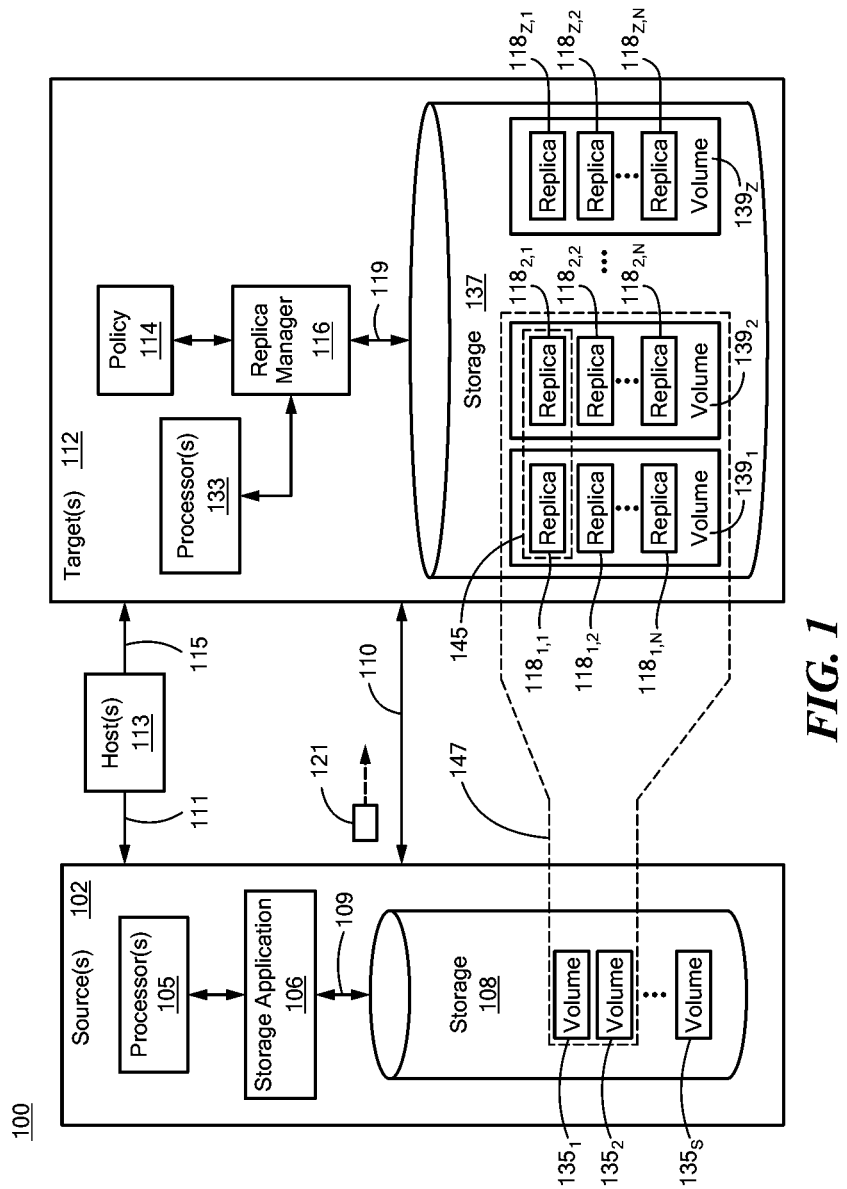
FIG. 1 is a block diagram of an example of a storage system to perform data replication from a source to a target in accordance with an illustrative embodiment.

FIG. 1 shows an example storage system 100. In accordance with illustrative embodiments, storage system 100 may perform live data migration of a tree of replicas (or snapshots) from a source site (e.g., 102) to a target site (e.g., 112).

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Target site 112 may include replica manager 116 that manages a plurality of replicas $118_{1-N}$ (generally referred to herein as replicas 118) according to a policy 114 (e.g., a replication and/or retention policy).

Replicas 118 may be stored in one or more volumes $139_{1-Z}$ of storage 137 of target site 112. Target site 112 may also include one or more processors 133. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may control and/or perform data migration 121 from source site 102 to target site 112 over communication link 110. Some illustrative embodiments include migration manager 113a, which may perform data migration 121. In some embodiments, migration manager 113a may be part of source site 102 (e.g., part of storage application 106). In some embodiments, migration manager 113a may be part of target site 112 (e.g., part of replica manager 116). In some embodiments, migration manager 113a may be an external device in communication with source site 102 and target site 112, for example via communication links 111 and 115. In some embodiments, such as shown in FIG. 1, migration manager 113a may be implemented on one or more of hosts 113.

In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include internal (e.g., short distance) communication links (shown as communication links 109 and 119) to transfer data between storage volumes $139_{1-Z}$ for storing replicas $118_{1-N}$, such as an InfiniBand (IB) link or Fibre Channel (FC) link.

In illustrative embodiments, storage system 100 may employ a snapshot (or replication) mechanism to replicate data between source site 102 and target site 112. A replica (or snapshot) may be created from data within storage 108 and transferred to one or more target sites 112 during a data replication cycle. Data replication may be performed based on data replication policies that may define various settings for data recovery operations, shown as policy 114. For example, policy 114 may define a plurality of attributes, such as a frequency with which replicas are generated and how long each replica 118 is kept at target site 112. In some embodiments, one or both of storage application and/or replica manager 116 may define a remote replica lag (e.g., the length of time during which updates may be lost in case of a failure of source site 102), a recovery point objective (RPO) (e.g., a maximum acceptable lag time between the time data is committed to source site 102 and the time the data is committed to target site 112 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes. For example, in one embodiment, storage application 106 may define the remote replica lag, RPO, RTO and/or other attributes, and policy 114 and replica manager 116 may define the retention policy. In some embodiments, policy 114 may define the remote replica lag, RPO, RTO, retention policy, and/or other attributes.

As described herein, in example embodiments, data replication may be asynchronous data replication performed at time-based intervals during operation of storage system 100. The timing of asynchronous replication cycles and the retention of the replicas 118 may be managed by one or both of storage application 106 of source site 102 and replica manager 116 of target site 112. In one embodiment, storage application 106 of source site 102 may define the timing of asynchronous replication cycles, and the retention may be defined by policy 114. Data replication may alternatively be synchronous data replication performed when data is changed on source site 102.

For example, asynchronous data replication may periodically generate snapshots (or replicas), scan and compare the snapshots to determine changes in data between the snapshots, and transfer the data difference to target site 112. The frequency with which to perform replication cycles may be determined by a recovery point objective (RPO) and/or retention policy settings of policy 114. For example, policy 114 may define an RPO setting of x seconds, where x may be a positive integer, to ensure that the most recent available replica 118 stored on target site 112 reflects the state of data stored on source site 102 no longer than x seconds ago. Policy 114 may also determine how many replicas 118 should be maintained, at what time (e.g., what time of day, week, month, etc.), and for what duration.

Storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ (135 generally) and two target volumes $139_1$ and $139_2$ (139 generally). Each target volume 139 may include one or more replicas 118. For example, volume $139_1$ may include replicas $118_{1,1}$-$118_{1,N}$, volume $139_2$ may include replicas $118_{2,1}$-$118_{2,N}$, and volume $139_Z$ may include replicas $118_{Z,1}$-$118_{Z,N}$. In some embodiments, replicas 118 for respective source volumes 135 of consistency group 147 may be grouped into sets (e.g., a snapshot set or snapset). Thus, as illustrated in FIG. 1, replica $118_{1,1}$ created for source volume $135_1$, and replica $118_{2,1}$ created for source volume $135_2$ of consistency group 147 may be included in snapset 145.

Illustrative embodiments may migrate data from one or more volumes $135_{1-S}$ of source site 102 to one or more volumes $139_{1-Z}$ of storage 137 of target site 112 in a "seamless" manner, shown as data migration 121. For example, data migration operation 121 may be said to be seamless if data is migrated from a first set of volumes of source site 102 (e.g., a first set of volumes $135_{1-S}$) to a second set of volumes $139_{1-Z}$ of storage 137 of target site 112 while the storage system is operating and without the migrated data being unavailable to storage system 100 for other input/output (I/O) operations such as reads or writes. In other words, relocation of the data from source site 102 to target site 112 is "invisible" to users of the storage system in that the storage system is operable throughout data migration operation 121. In some embodiments, the migrated data may include snapshots (or replicas) created for data recovery.

Once the data is moved from source site 102 to target site 112 (including SCSI "personalities" of the source volumes), hosts 113 may connect to volumes $139_{1-Z}$ of target site 112, and the volumes $135_{1-S}$ of source site 102 can be deactivated (e.g., cutover). In some embodiments, a SCSI personality of a given volume may include meta-data associated with the volume. The meta-data may include, for example, one or more properties of the given volume (e.g., size, block size, transfer size, one or more features supported by the volume, etc.), one or more identifiers associated with the given volume (e.g., a volume serial number, a volume address, or vendor information of the volume) and dynamic state information of the volume (e.g., SCSI reservation state information of the volume, Asymmetric Logical Unit Access (ALUA) state information of the volume, etc.). In some embodiments, the SCSI personality meta-data may be stored in one or more inquiry pages of the volume, such as Vital Product Data (VPD) information pages of the volume. During data migration operation 121, the SCSI personalities of given ones of target volumes $139_{1-Z}$ may be matched to the SCSI personalities of associated ones of source volumes $135_{1-S}$.

In some embodiments, during data migration operation 121, storage system 100 may operate in an active/passive mode, where hosts 113 cutover from source site 102 to target site 112, such that only one of the source site 102 and the target site 112 is accessible by hosts 113. In some embodiments, during data migration operation 121, storage system 100 may operate in an active/active mode, where hosts 113 are allowed concurrent access to both source site 102 and target site 112. In the active/active mode, source site 102 (or one or more volumes 135 of source site 102) may later be disconnected and removed, and hosts 113 access only target site 112.

Figure 2:
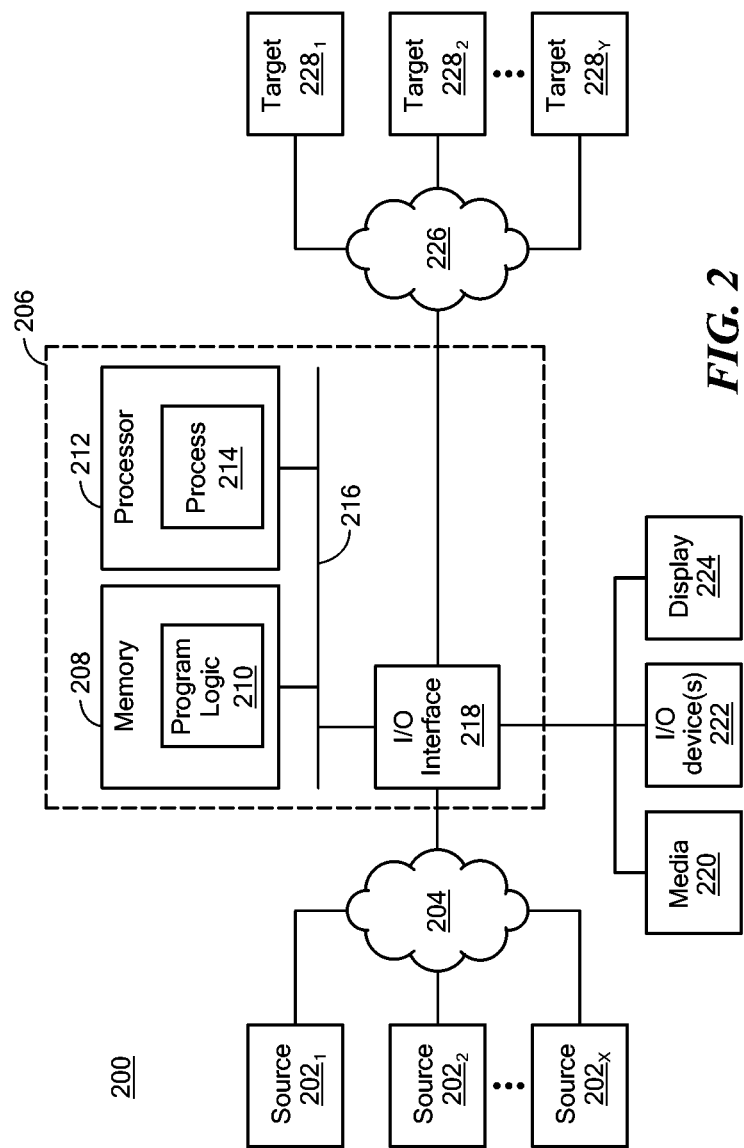
FIG. 2 is a block diagram of another example of a storage system to perform data replication from a source to a target in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

As described in conjunction with FIG. 1, target devices 112 may include one or more storage volumes $139_{1-Z}$ to store a plurality of replicas (or snapshots) $118_{1-N}$. Replicas $118_{1-N}$ may include replicas of storage 108 and/or replicas of other replicas. As also will be described herein, replicas $118_{1-N}$ may be saved and accessed in a hierarchy or tree structure. Replica manager 116 may be used to retrieve data from the replicas when requested, for example, by storage application 106.

Some embodiments of storage system 100 may store data in fixed-size chunks, for example 4 KB chunks, where each chunk may have an associated unique hash value. In such embodiments, storage system 100 may be configured to maintain a mapping between I/O (or logical) addresses associated with data and the hash values, and also to maintain a mapping between the hash values and physical storage addresses of the data. These mappings may be maintained using one or more address-to-hash ("A2H") tables and/or one or more hash-to-physical address ("H2P") tables. It will be appreciated that combinations of the A2H and H2P tables may provide multiple levels of indirection between the logical (or "I/O") address used to access data and the physical address where that data is stored. Among other advantages, this may allow storage system 100 freedom to move data within storage 108.

Figure 3:
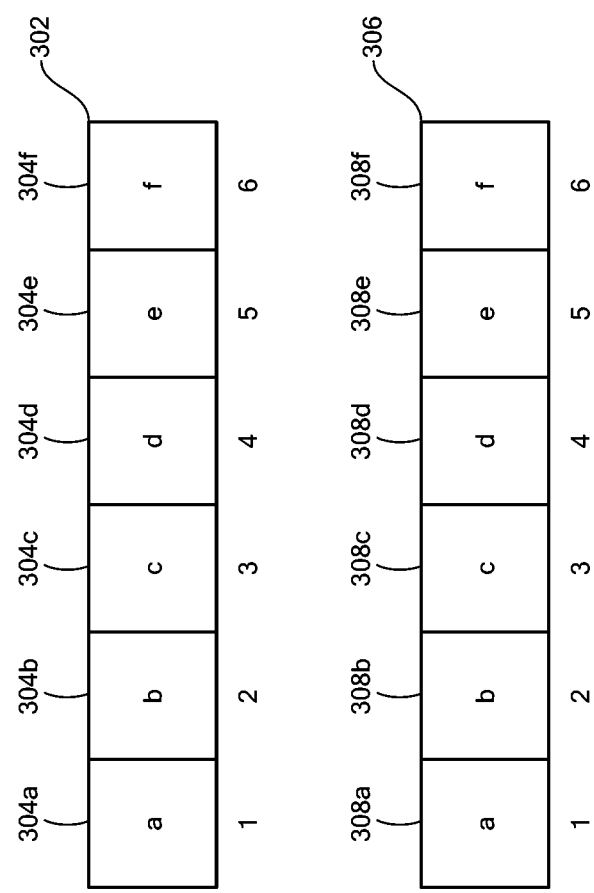
FIG. 3 is a block diagram of an example of a volume and a replica of the volume, in accordance with an illustrative embodiment.

Referring to FIG. 3, in a hierarchical replica tree, one or more address-to-hash tables may be employed such that two or more volumes (e.g., volumes 302 and 306) appear to be independent volumes storing the same data, but each piece of data (e.g., a-f) is stored elsewhere. For example, the address-to-hash tables may be transparent to storage application 106 such that storage application 106 can access data without knowing the exact location of the data in the replica hierarchy. For example, as shown in FIG. 3, storage application 106 (FIG. 1) can access (e.g., to perform I/O operations) or "see" volume 302 and volume 306, which is a replica (or snapshot) of volume 302. Volume 302 includes offsets (e.g., a first offset (offset 1) 304a, a second offset (offset 2) 304b, a third offset (offset 3) 304c, a fourth offset (offset 4) 304d, a fifth offset (offset 5) 304e and a sixth offset (offset 6) 304f. The offsets 304a-304f store values a, b, c, d, e, f, and g, respectively. Volume 306 (e.g., the replica of volume 302) includes offsets (e.g., a first offset (offset 1) 308a, a second offset (offset 2) 308b, a third offset (offset 3) 308c, a fourth offset (offset 4) 308d, a fifth offset (offset 5) 308e and a sixth (offset 6) offset 308f. The offsets 308a-308f store values a, b, c, d, e, f, g, respectively.

Figure 4:
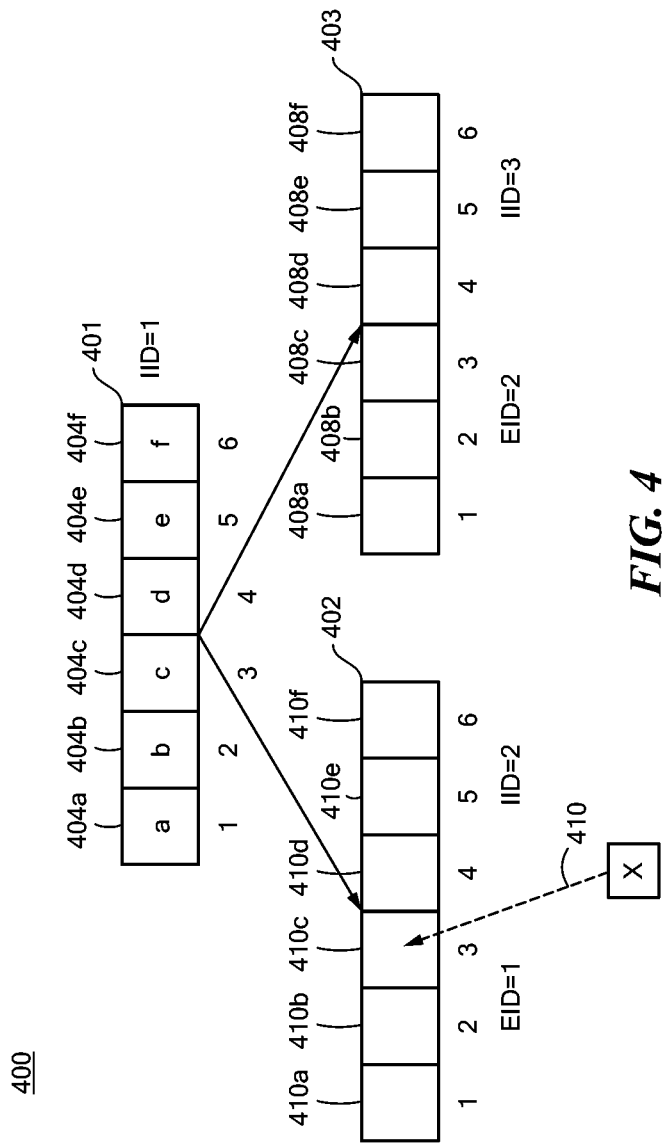
FIG. 4 is a block diagram of an example of a hierarchical snapshot tree in accordance with an illustrative embodiment.

Referring to FIG. 4, a system includes volumes, each of which may include one or more logical unit devices or LUNs, shown as LUNs 401, 402 and 403. Storage application 106 (FIG. 1) may not see LUN 401 (e.g., storage application 106 does not access or perform I/O operations to LUN 401). LUN 401 may include offsets (e.g., a first offset (offset 1) 404a, a second offset (offset 2) 404b, a third offset (offset 3) 404c, a fourth offset (offset 4) 404d, a fifth offset (offset 5) 404e and a sixth (offset 6) offset 404f. Offsets 404a-404f may store values a, b, c, d, e, f, g, respectively. LUN 401 may be designated with an internal identifier (IID) equal to "1." The IID of a LUN may be transparent to storage application 106.

LUN 402 may represent an original LUN to storage application 106 (e.g., LUN 402 is the production volume). LUN 402 may include offsets (e.g., a first offset (offset 1) 410a, a second offset (offset 2) 410b, a third offset (offset 3) 410c, a fourth offset (offset 4) 410d, a fifth offset (offset 5) 410e and a sixth (offset 6) offset 410f. LUN 402 has IID equal to "2" and an external ID (EID) equal to "1". The EID may be used by storage application 106 to identify the LUN.

LUN 403 may be a snapshot of LUN 401 and may include offsets (e.g., a first offset (offset 1) 408a, a second offset (offset 2) 408b, a third offset (offset 3) 408c, a fourth offset (offset 4) 408d, a fifth offset (offset 5) 408e and a sixth (offset 6) offset 408f. LUN 402 has IID equal to "3" and an external ID (EID) equal to "2".

As shown in FIG. 4, the offsets 410a-410f of LUN 402 and the offsets 408a-408f of LUN 403 may have no values stored. Rather than having twice the amount of data stored, the data may need only be saved in one location of LUN 401. LUNs 402 and 403 may be leafs in the hierarchical snapshot tree and are identified to storage application 106 through the EID. In some embodiments, the stored data (e.g., at any of offsets 410a-410f of LUN 402 and the offsets 408a-408f of LUN 403) may be a hash signature. The hash signature may refer to data stored elsewhere in the storage system such that the storage system can retrieve a given page based on the stored hash signature. However, a LUN that does not have an EID (i.e., not a leaf) may be transparent to storage application 106. As used herein LUN 401 may be identified as an ancestor (i.e., a parent) of LUNs 402 and 403, and LUNs 402 and 403 are children of LUN 401.

If storage application 106 requests to read data from offset 4 (e.g., the fourth offset 408d) of LUN 403, replica manager 116 may determine that offset 4 (the fourth offset 408d) is empty, and may go to the parent of LUN 403 (in this example, to offset 4 (the fourth offset 404d) of LUN 401), to retrieve the value "d" and returns the value "d" to storage application 106.

Any updates to the original data in LUN 401 that are written by storage application 106 may be written instead to LUN 402 (e.g., the original or production volume). For example, storage application 106 or some other application (not shown) may write a value "x" to offset 3 (the third offset 410c) of LUN 402, as indicated by dashed line 410. If storage application 106 needs to read offset 3 (the third offset 410c) of LUN 402, replica manager 116 may determine that offset 3 (the third offset 410c) is not empty and return the value "x" to storage application 106.

Figure 5:
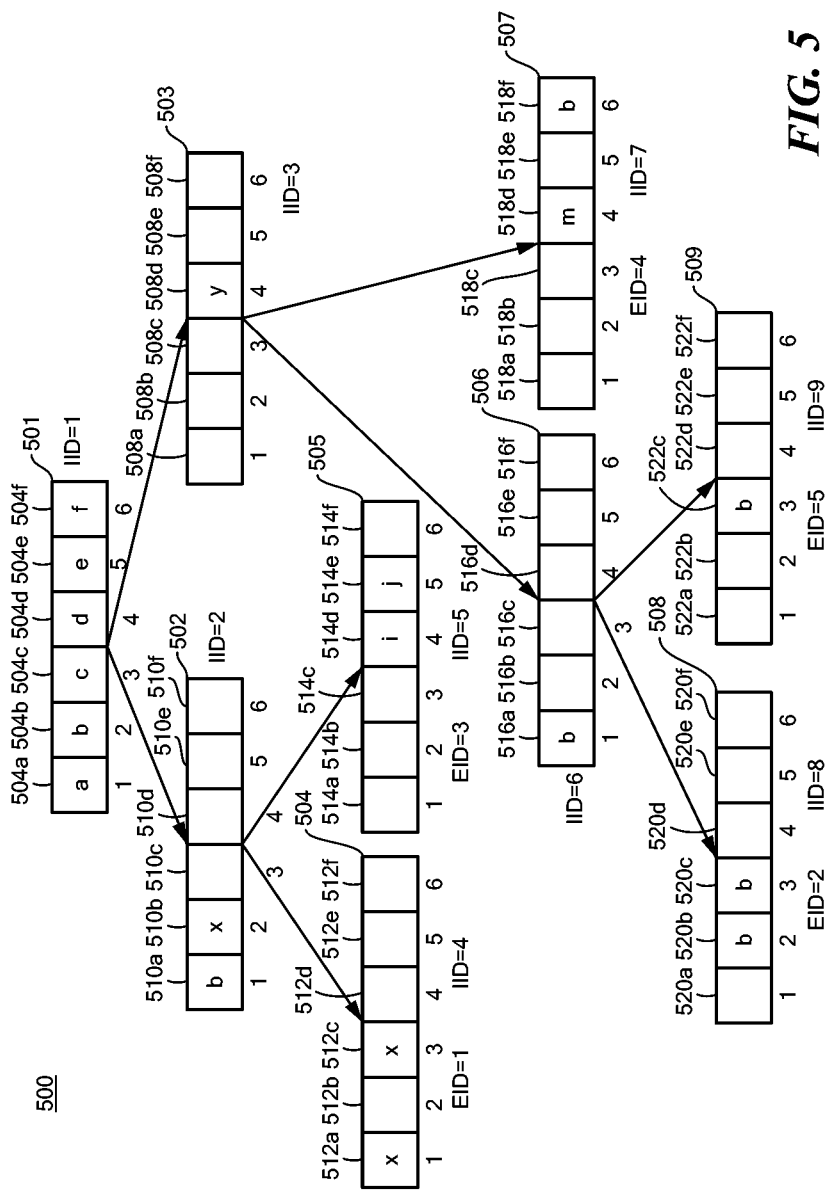
FIG. 5 is a block diagram of an example of a hierarchical snapshot tree in accordance with an illustrative embodiment.

Referring to FIG. 5, hierarchical replica tree 500 may include volumes (e.g., logical unit devices or LUNs 501-509). As shown in the illustrative embodiment of FIG. 5, LUN 503 is a replica (or snapshot) of original LUN 501, LUN 505 is a replica (or snapshot) of LUN 502, LUN 507 is a replica (or snapshot) of LUN 503 and LUN 509 is a replica (or snapshot) of LUN 506. LUNs 504, 505, 507, 508 and 509 are leaf nodes.

LUN 501 may include offsets (e.g., a first offset (offset 1) 504a, a second offset (offset 2) 504b, a third offset (offset 3) 504c, a fourth offset (offset 4) 504d, a fifth offset (offset 5) 504e and a sixth (offset 6) offset 504f. The offsets 504a-504f may store values a, b, c, d, e, f, g, respectively. LUN 501 is designated with an IID equal to "1" in the illustrative embodiment.

LUN 502 includes offsets (e.g., a first offset (offset 1) 510a, a second offset (offset 2) 510b, a third offset (offset 3) 510c, a fourth offset (offset 4) 510d, a fifth offset (offset 5) 510e and a sixth (offset 6) offset 510f. Offsets 510a and 510b may store values "b" and "x," respectively, while offsets 510c-510f may be empty. LUN 502 is designated with an IID equal to "2" in the illustrative embodiment.

LUN 503 may include offsets (e.g., a first offset (offset 1) 508a, a second offset (offset 2) 508b, a third offset (offset 3) 508c, a fourth offset (offset 4) 508d, a fifth offset (offset 5) 508e and a sixth (offset 6) offset 508f. Offset 508d may store a value "y" while offsets 508a-508c, 508e and 508f may be empty. LUN 503 is designated with an IID equal to "3" in the illustrative embodiment.

LUN 504 may include offsets (e.g., a first offset (offset 1) 512a, a second offset (offset 2) 512b, a third offset (offset 3) 512c, a fourth offset (offset 4) 512d, a fifth offset (offset 5) 512e and a sixth (offset 6) offset 512f. Offset 512a, 512c may store values "x" and "x," respectively, while offsets 512b and 512d-512f may be empty. LUN 504 is designated with an IID equal to "4" and EID equal to "1" in the illustrative embodiment.

LUN 505 may include offsets (e.g., a first offset (offset 1) 514a, a second offset (offset 2) 514b, a third offset (offset 3) 514c, a fourth offset (offset 4) 514d, a fifth offset (offset 5) 514e and a sixth (offset 6) offset 514f. Offsets 514d and 514e may store values "i" and "j," respectively, while offsets 514a-514c and 512f may be empty. LUN 505 is designated with an IID equal to "5" and EID equal to "3" in the illustrative embodiment.

LUN 506 may include offsets (e.g., a first offset (offset 1) 516a, a second offset (offset 2) 516b, a third offset (offset 3) 516c, a fourth offset (offset 4) 516d, a fifth offset (offset 5) 516e and a sixth (offset 6) offset 516f. Offset 516a may store a value "b" and while offsets 516b-516f may be empty. LUN 506 is designated with an IID equal to "6" in the illustrative embodiment.

LUN 507 may include offsets (e.g., a first offset (offset 1) 518a, a second offset (offset 2) 518b, a third offset (offset 3) 518c, a fourth offset (offset 4) 518d, a fifth offset (offset 5) 518e and a sixth (offset 6) offset 518f. Offsets 518d and 518f may store values "m" and "b," respectively while offsets 518a-518c and 518e may be empty. LUN 507 is designated with an IID equal to "7" and an EID equal to "4" in the illustrative embodiment.

LUN 508 may include offsets (e.g., a first offset (offset 1) 520a, a second offset (offset 2) 520b, a third offset (offset 3) 520c, a fourth offset (offset 4) 520d, a fifth offset (offset 5) 520e and a sixth (offset 6) offset 520f. Offsets 520b and 520c may store values "b" and "b," respectively, while offsets 520a and 520d-520f may be empty. LUN 508 is designated with an IID equal to "8" and an EID equal to "2" in the illustrative embodiment.

LUN 509 may include offsets (e.g., a first offset (offset 1) 522a, a second offset (offset 2) 522b, a third offset (offset 3) 522c, a fourth offset (offset 4) 522d, a fifth offset (offset 5) 522e and a sixth (offset 6) offset 522f. Offset 522c may store a value "b" while offsets 522a, 522b and 522db-522f may be empty. LUN 509 is designated with an IID equal to "9" and an EID equal to "5" in the illustrative embodiment.

If storage application 106 requests to read the LUN with an EID of "5" at the fourth offset, an illustrative embodiment may first access LUN 509 and read the fourth offset 522d. Since no data is available at offset 522d, the parent of LUN 509 (e.g., LUN 506) may be read at the fourth offset, 516d. Since no data is available at the offset 516d, the parent of LUN 506 (e.g., LUN 503) may be read at the fourth offset, 508d. Since data is available at the offset 508d, the value "y" may be returned to storage application 106.

Described embodiments may employ one or more hierarchical replica trees, such as shown in FIG. 5, that may include nodes representative of a volume of data. In an illustrative embodiment, each hierarchical replica tree may be associated with a consistency group (or snapgroup) of storage system 100. As described herein, storage 108 may include one or more consistency groups, shown as consistency groups $147_{1-Q}$, each consistency group 147 including two or more volumes 135 and two or more associated replicas 118. For example, a consistency group (or snapgroup) may be a group of volumes 135 and replicas 118 that are treated as a single entity for data replication and data migration. For example, a consistency group (or snapgroup) may be a group of volumes 135 for which associated replicas (e.g., snapshots) 118 are generated at the same time.

As described herein, each child, or leaf node, may inherit data from its parent node (e.g., as described, reading an empty offset in a child node may cause storage system 100 to retrieve data from the corresponding offset of the parent node). In illustrative embodiments, when a replica (snapshot) is created for a volume, the volume may become a parent (internal) node to one or more child (leaf) nodes. For example, as described in conjunction with FIG. 5, a first child (leaf) node may be a replica (snapshot), while a second child (leaf) node may represent a production volume. At the initial creation, the child (leaf) nodes may be empty, but during operation of storage system 100, the child (leaf) nodes include data changes versus the parent (internal) node.

Although shown in FIGS. 4 and 5 as employing a binary tree hierarchy (e.g., each parent node has two direct child or leaf nodes), some embodiments may employ other tree hierarchies (e.g., that allow additional child or leaf nodes for each parent node, and so forth).

In illustrative embodiments, parent (internal) nodes may represent static data, and child (leaf) nodes may represent visible volumes (e.g., volumes that are accessible to hosts 113) having data that may be modified by host I/O operations. For example, if a parent (internal) node represents static data, an associated child (leaf) node may represent changes from the static data of the parent node from the time the child (leaf) node was created. In an illustrative embodiment, a leaf node may represent a replica (snapshot), and a parent node may represent the volume associated with the replica (snapshot). For example, a replica (snapshot) may represent a point-in-time copy of a parent volume, but the replica (snapshot) may diverge from the parent volume over time (e.g., the replica data may be modified), for example as described in conjunction with FIG. 5.

Described embodiments may provide live (seamless) migration of the entire tree from a source storage array (e.g., 102) to a target storage array (e.g., 112), where storage system 100 is not taken offline during the migration (e.g., the data and/or volumes do not become inaccessible to hosts 113 during the migration). Further, described embodiments may migrate both source volumes and associated replicas (snapshots) without migrating the replicas (snapshots) as full volumes, which saves storage space on target site 112. For example, in some embodiments, for a full volume, all the data contents of the volume would be copied to the target. However, in some embodiments, data associated with a given replica (snapshot) may contain relatively few changes (or none at all) relative to data associated with a parent volume. Since a child (leaf) node may include only changed or modified data relative to an associated parent (internal) node, described embodiments may migrate replicas (snapshots) by copying only changed data for each replica.

Figure 6:
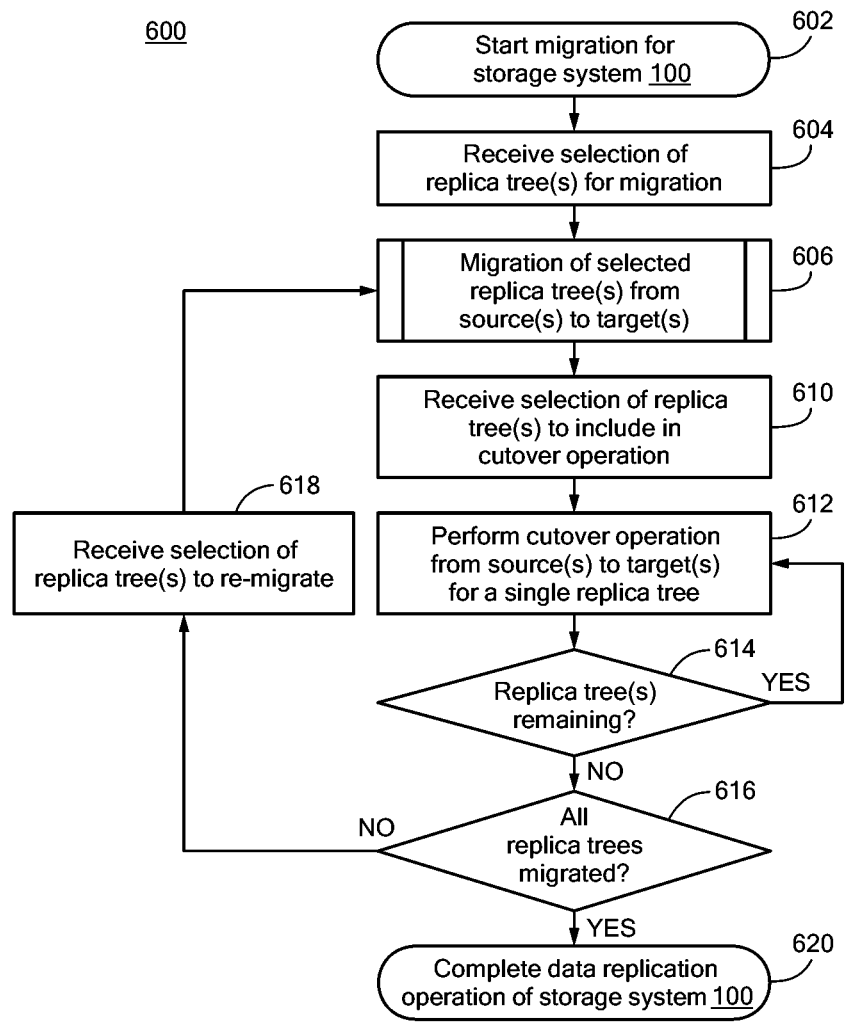
FIG. 6 is a flow diagram of an example of a process to perform migration of a tree of replicas from a source to a target in accordance with an illustrative embodiment.

Referring to FIG. 6, process 600 is an example of a process to perform at least a part of a replica hierarchy migration operation of storage system 100 in accordance with illustrative embodiments. At block 602, the replica hierarchy migration operation of storage system 100 begins, for example, when a replica hierarchy migration command is received. Although not shown in FIG. 6, in some embodiments, prior to starting migration process 600, storage system 100 may optionally merge and/or delete unneeded or excess replicas (snapshots) to reduce the number of replicas (and the amount of data) to be migrated. Additionally, although not shown in FIG. 6, in some embodiments, prior to starting migration process 600, storage system 100 may optionally create a new replica (snapshot) for one or more leaf nodes of the selected replica hierarchy to increase (in an embodiment, ideally, maximize) the amount of static data (e.g., internal nodes) and reduce (in an embodiment, ideally, minimize) the amount of non-static data to be migrated.

At block 604, storage system 100 may receive a selection of one or more hierarchical replica trees (e.g., hierarchical replica tree 500 of FIG. 5) of storage 108 to migrate to one or more volumes of target site 112. In described embodiments, a hierarchical replica tree may be a grouping of one or more volumes and one or more associated replicas (or snapshots) such as described in conjunction with FIGS. 3-5.

At block 606, data migration may be performed for the selected one or more hierarchical replica trees (e.g., data associated with the structure of the selected hierarchical replica tree and data associated with each node of the selected hierarchical replica tree is copied and stored on one or more corresponding target volumes). Block 606 will be described in greater detail in conjunction with FIG. 7.

Although not shown in FIG. 6, after block 606, some embodiments may optionally perform a discovery operation to determine whether corresponding target volumes can be accessed by one or more host devices before performing a cutover operation (e.g., at block 610). For example, described embodiments may track which hosts 113 have recognized which target volumes (e.g., volumes of target site 112) and, thus, allow replica hierarchy migration to complete by performing a cutover from a source to a target (e.g., deactivation of the source) once all host devices have recognized one or more target volumes associated with migrated hierarchical replica tree. For example, in an illustrative embodiment, the discovery operation may be performed as described in co-pending United States Patent Application Number [TBD], filed on common date herewith, entitled "DETECTION OF HOST CONNECTIVITY FOR DATA MIGRATION IN A STORAGE SYSTEM," which is assigned to the same assignee as this patent application and is incorporated herein by reference in its entirety.

At block 610, storage system 100 may receive a selection of at least a portion of a hierarchical replica tree to include in a cutover operation and, at block 612, the cutover operation may be performed for the portion of the hierarchical replica tree selected at block 610. For example, a cutover operation from a source device to a target device may allow host access only to the target device and allow the source device to be deactivated. As indicated by block 614, block 612 may be iteratively repeated until all the hierarchical replica trees have had the cutover operation performed. At block 614, once all the hierarchical replica trees have had the cutover operation performed, at block 616 storage system 100 determines whether all the hierarchical replica trees have been successfully migrated. If, at block 616, one or more of the hierarchical replica trees have not been successfully migrated, then at block 618, a request to re-attempt migration may be received, and process 600 may repeat at block 606. Alternatively, at block 618, a request to cancel migration may be received (e.g., to determine a cause of the migration failure, etc.). If, at block 616, the hierarchical replica trees have been successfully migrated, then at block 620, replica hierarchy migration process 600 completes.

In described embodiments, replica hierarchy migration process 600 is "live," such that hosts 113 may access the data being migrated during the migration process (e.g., hosts 113 may read and write to source site 102 during the migration process).

Figures 7, 8, 9:
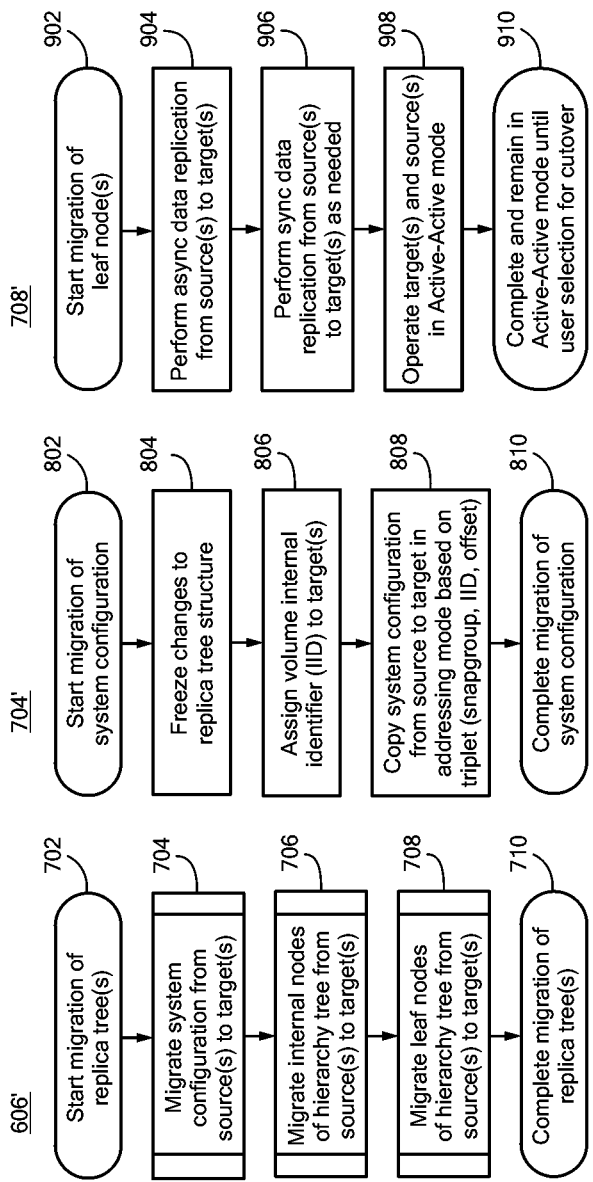
FIG. 7 is a flow diagram of an example of a process to migrate a tree of replicas for the migration process of FIG. 6 in accordance with an illustrative embodiment.
FIG. 8 is a flow diagram of an example of a process to migrate system configuration data for the migration process of FIG. 7 in accordance with an illustrative embodiment.
FIG. 9 is a flow diagram of an example of a process to migrate selected leaf nodes of the tree of replicas for the migration process of FIG. 7 in accordance with an illustrative embodiment.

Referring to FIG. 7, process 606' is an example process for migrating the selected replica tree hierarchies at block 606 of FIG. 6. At block 702, process 606' begins. At block 704, configuration information associated with the selected replica tree hierarchy may be migrated from source site 102 to target site 112. Block 704 will be described in greater detail in conjunction with FIG. 8. At block 706, data associated with one or more internal nodes of the selected replica tree hierarchy may be migrated from source site 102 to target site 112. As described, in some embodiments, internal nodes may be associated with static data that may be copied from source site 102 to target site 112 as a background operation of storage system 100 (e.g., as an asynchronous data replication operation). For example, at block

706, migration manager 113 may replicate static data associated with internal (and/or unmapped) nodes of the selected replica tree hierarchy. Since the data is static, a single-pass process may be employed to copy the data to target site 112, in other words, the static data may be copied once.

At block 708, data associated with one or more leaf nodes of the selected replica tree hierarchy may be migrated from source site 102 to target site 112. As described, in some embodiments, leaf nodes may be associated with non-static data that may be modified during operation of storage system 100. Block 708 will be described in greater detail in conjunction with FIG. 9. In described embodiments, leaf nodes may be migrated assuming that target site 112 already contains the data of the source volume's parent (internal) node, since the internal nodes are migrated as a background operation of storage system 100 (e.g., at step 706). At block 710, process 606' completes.

Referring to FIG. 8, process 704' is an example process for migrating the selected replica tree hierarchies at block 704 of FIG. 7. At block 802, process 704' begins. At block 804, migration manager 113 may "freeze" the replica tree structure for the selected replica tree hierarchy. For example, migration manager 113 may not permit storage system 100 to modify the structure of the replica tree hierarchy (e.g., may not allow storage system 100 to add, merge or delete nodes of the replica tree hierarchy). For example, a new replica may not be created. At block 806, each volume of target site 112 may be assigned an internal identifier (IID) to uniquely identify each target volume. The IID may be assigned as described in conjunction with FIG. 5.

At block 808, the replica tree structure may be copied from source site 102 to target site 112, including internal and leaf nodes and associated relationships. Each node created on target site 112 may be paired with an associated node on source site 102. In described embodiments, the nodes may be addressed based on the node pairing information and the IID assigned at block 806. For example, the nodes may be addressed using a triplet based on an identifier associated with the selected replica tree hierarchy (e.g., a snapgroup identifier), the IID, and an offset associated with the data, such as described in conjunction with FIG. 5. At block 810, process 704' completes.

At block 808, described embodiments may employ a command that replicates the structure of the replica tree hierarchy (snapgroup) from source site 102 to target site 112, including all internal and leaf nodes. An example of a snapgroup hierarchy is described by the node hierarchy shown in FIG. 5. As described, nodes may be paired using a snapgroup pairing identifier, a volume IID, and an offset, such that migration manager 113 may read external nodes (e.g., mapped nodes) and pair nodes between the source and target.

Referring to FIG. 9, process 708' is an example of a process to perform migration of leaf nodes of a replica tree (e.g., hierarchical replica tree 500 shown in FIG. 5) from source devices to target devices. In some embodiments, process 708' may be performed multiple times, either in series or in parallel, to perform migration for each leaf node of hierarchical replica tree 500. At block 902, process 708' starts. At block 904, an asynchronous (async) data replication operation may be performed to replicate leaf node data from source site 102 to target site 112. At block 906, one or more synchronous (sync) data replication operations may be performed as needed, for example when leaf node data is changed on source site 102 such that target site 112 includes up-to-date replicas of the leaf nodes. At block 908, source site 102 and target site 112 are operated in active-active mode. In described embodiments, in the active-active mode, source site 102 may be active and accessible by hosts 113, and target site 112 may also be active and accessible by hosts 113. Operation may continue in active-active mode until the cutover operation is performed at block 612 (FIG. 6), for example by receiving a selection of one or more leaf nodes to include in the cutover operation. At block 910, migration operation 708' completes.

Figure 10:
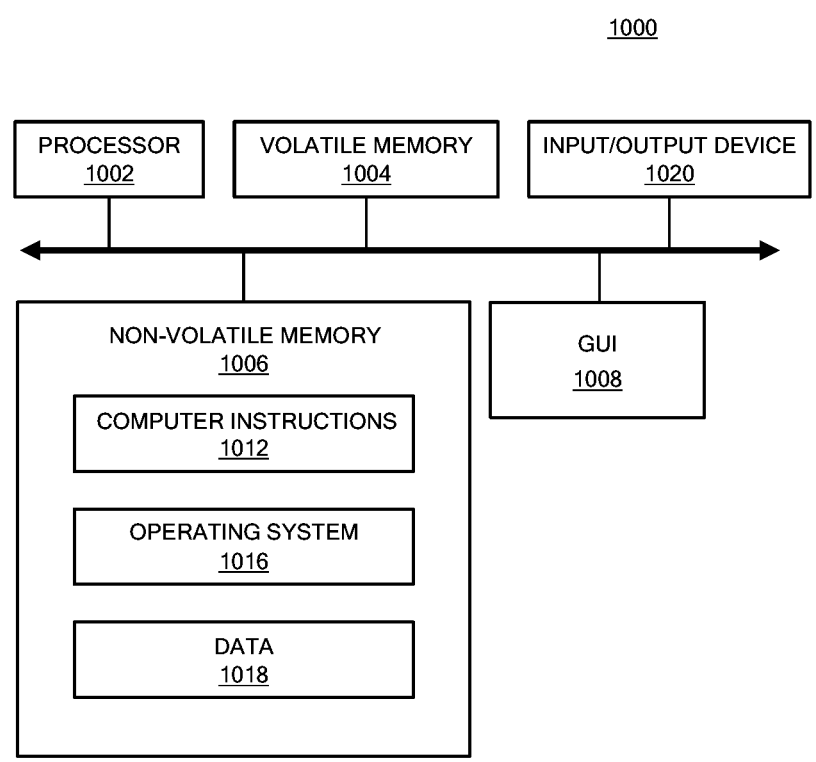
FIG. 10 is a block diagram of an example of a hardware device that may perform at least a portion of the processes of FIGS. 3-9 in accordance with an illustrative embodiment.

Referring to FIG. 10, in some embodiments, source site 102 and/or target site 112 are implemented as one or more computers. Computer 1000 may include processor 1002, volatile memory 1004 (e.g., RAM), non-volatile memory 1006 (e.g., a hard disk drive, solid state drive such as a flash drive, a hybrid magnetic and solid state drive, etc.), graphical user interface (GUI) 1008 (e.g., a mouse, a keyboard, a display, and so forth) and input/output (I/O) device 1020. Non-volatile memory 1006 stores computer instructions 1012, an operating system 1016 and data 1018 such that, for example, the computer instructions 1012 are executed by the processor 1002 out of volatile memory 1004 to perform at least a portion of processes 600, 606', 704' and 708' (FIGS. 6, 7, 8 and 9). Program code may be applied to data entered using an input device of GUI 1008 or received from I/O device 1020.

Processes 600, 606', 704' and 708' are not limited to use with the hardware and software of FIG. 10 and may find applicability in any computing or processing environment and with any type of machine or set of machines that is capable of running a computer program. Processes 600, 606', 704' and 708' may be implemented in hardware, software, or a combination of the two.

The processes described herein are not limited to the specific embodiments described. For example, processes 600, 606', 704' and 708' are not limited to the specific processing order shown in FIGS. 6, 7, 8 and 9. Rather, any of the blocks of processes 600, 606', 704' and 708' may be re-ordered, combined or removed, performed in parallel or in serial, as necessary, to achieve the results set forth herein.

Processor 1002 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for migrating a replica hierarchy from at least one source device to at least one target device in a storage system, the method comprising:
    migrating a configuration of the replica hierarchy;
    migrating one or more internal nodes of the replica hierarchy;
    migrating one or more leaf nodes of the replica hierarchy; and
    performing a cutover operation by deactivating the at least one source device associated with the replica hierarchy,
    wherein migrating the configuration of the replica hierarchy comprises:
    preventing a change to a structure of the replica hierarchy;
    assigning an identifier to the at least one target device; and
        copying the configuration from the at least one source device to the at least one target device in an addressing mode based on the assigned identifier and identification information of the replica hierarchy, and
    wherein the identification information of the replica hierarchy comprises a triplet comprising a snapgroup pair identifier, the assigned identifier of the target volume, and an offset associated with a data location of the replica hierarchy.

2. The method of claim 1, wherein the snapgroup pair identifier is an identifier associated with the replica hierarchy.

3. The method of claim 1, wherein the assigned identifier comprises a unique volume internal identifier (IID) associated with each volume of the at least one target device, and wherein the offset comprises a logical page address of the at least one target device.

4. The method of claim 1, further comprising, before migrating the replica hierarchy, generating a replica of each leaf node of the replica hierarchy.

5. The method of claim 4, wherein generating a replica of each leaf node comprises:
    generating at least one new leaf node associated with each replicated leaf node, wherein the replicated leaf node is a parent node of the at least one new leaf node; and
    modifying the replicated leaf node from a visible node to an internal node, wherein each internal node contains static data that is not visible to a host device of the storage system.

6. The method of claim 5, wherein each leaf node contains data modified with respect to an associated parent node.

7. The method of claim 6, wherein generating a replica of each leaf node of the replica hierarchy increases an amount of static data associated with one or more internal nodes that can be migrated as a background operation during operation of the storage system, and reduces an amount of non-static data associated with one or more leaf nodes.

8. The method of claim 1, wherein migrating one or more internal nodes of the replica hierarchy comprises copying data associated with the internal nodes from the at least one source device to the at least one target device.

9. The method of claim 8, wherein copying data associated with the internal nodes is performed as a background operation during operation of the storage system.

10. The method of claim 1, wherein migrating one or more leaf nodes of the replica hierarchy comprises:
    performing an asynchronous data replication operation to copy data associated with the one or more leaf nodes from the at least one source device to the at least one target device;
    performing one or more synchronous data replication operations from the at least one source device to the at least one target device if data stored associated with the one or more leaf nodes on the at least one source device is changed; and
    operating the one or more leaf nodes on the at least one source device and the at least one target device in an active-active mode,
    wherein in the active-active mode, the at least one source device is active and accessible by one or more host devices to store current data associated with the one or more leaf nodes, and the at least one target device is active and accessible by one or more host devices to store current data associated with the one or more leaf nodes.

11. The method of claim 1, wherein the replica hierarchy comprises a tree hierarchy comprising one or more internal nodes containing static data, and one or more leaf nodes containing non-static data.

12. The method of claim 11, wherein the tree hierarchy comprises a binary tree hierarchy, wherein an internal node is a parent node of the replica hierarchy, and a leaf node is a child node of the replica hierarchy.

13. The method of claim 1, further comprising, in response to a request to modify the replica hierarchy:
merging one or more nodes of the replica hierarchy; or
deleting one or more nodes of the replica hierarchy.

14. A system comprising:
a processor; and
memory storing computer program code that when executed on the processor causes the processor to execute a migration process operable to perform the operations of:
migrating a replica hierarchy from at least one source device to at least one target device in a storage system by:
migrating a configuration of the replica hierarchy;
migrating one or more internal nodes of the replica hierarchy; and
migrating one or more leaf nodes of the replica hierarchy; and
performing the cutover operation by deactivating the at least one source device associated with the replica hierarchy,
wherein migrating the configuration of the replica hierarchy comprises:
preventing a change to a structure of the replica hierarchy;
assigning an identifier to the at least one target device; and
copying the configuration from the at least one source device to the at least one target device in an addressing mode based on the assigned identifier and identification information of the replica hierarchy, and
wherein the identification information of the replica hierarchy comprises a triplet comprising a snapgroup pair identifier, the assigned identifier of the target volume, and an offset associated with a data location of the replica hierarchy.

15. The system of claim 14, wherein the program code that when executed on the processor causes the processor to execute a process further operable to perform the operations of:
generating at least one new leaf node associated with each replicated leaf node, wherein the replicated leaf node is a parent node of the at least one new leaf node; and
modifying the replicated leaf node from a visible node to an internal node, wherein each internal node contains static data that is not visible to a host device of the storage system.

16. The system of claim 15, wherein each leaf node contains data modified with respect to an associated parent node and wherein generating a replica of each leaf node increases an amount of static data associated with one or more internal nodes that can be migrated as a background operation during operation of the storage system, and reduces an amount of non-static data associated with one or more leaf nodes.

17. A computer program product including a non-transitory computer readable storage medium having computer program code encoded thereon that when executed on a processor of a computer causes the computer to execute a migration process, the computer program product comprising:
computer program code for migrating a replica hierarchy from at least one source device to at least one target device in a storage system by:
migrating a configuration of the replica hierarchy;
migrating one or more internal nodes of the replica hierarchy; and
migrating one or more leaf nodes of the replica hierarchy; and
computer program code for performing the cutover operation by deactivating the at least one source device associated with the replica hierarchy,
wherein migrating the configuration of the replica hierarchy comprises:
preventing a change to a structure of the replica hierarchy;
assigning an identifier to the at least one target device; and
copying the configuration from the at least one source device to the at least one target device in an addressing mode based on the assigned identifier and identification information of the replica hierarchy, and
wherein the identification information of the replica hierarchy comprises a triplet comprising a snapgroup pair identifier, the assigned identifier of the target volume, and an offset associated with a data location of the replica hierarchy.

18. The computer program product of claim 17, further comprising:
computer program code for generating at least one new leaf node associated with each replicated leaf node, wherein the replicated leaf node is a parent node of the at least one new leaf node; and
computer program code for modifying the replicated leaf node from a visible node to an internal node, wherein each internal node contains static data that is not visible to a host device of the storage system,
wherein each leaf node contains data modified with respect to an associated parent node and wherein generating a replica of each leaf node increases an amount of static data associated with one or more internal nodes that can be migrated as a background operation during operation of the storage system, and reduces an amount of non-static data associated with one or more leaf nodes.

* * * * *